(12) United States Patent
Yu

(10) Patent No.: US 6,634,989 B2
(45) Date of Patent: Oct. 21, 2003

(54) POWER OFF UPSHIFT CONTROL METHOD FOR AUTOMATIC TRANSMISSION

(75) Inventor: Pyung-Hwan Yu, Suwon (KR)

(73) Assignee: Hyundai Motor Company, Seoul (KR)

(*) Notice: Subject to any disclaimer, the term of this patent is extended or adjusted under 35 U.S.C. 154(b) by 131 days.

(21) Appl. No.: 09/749,559

(22) Filed: Dec. 28, 2000

(65) Prior Publication Data
US 2001/0007844 A1 Jul. 12, 2001

(30) Foreign Application Priority Data
Dec. 30, 1999 (KR) .............................. 99-66634

(51) Int. Cl.[7] .............................. F16H 51/00
(52) U.S. Cl. .................... 477/143; 364/424.1
(58) Field of Search ........................ 477/143, 148, 477/154, 156, 158, 120

(56) References Cited

U.S. PATENT DOCUMENTS

| | | | | |
|---|---|---|---|---|
| 4,949,595 A | * | 8/1990 | Shimanaka | 477/143 |
| 5,075,858 A | * | 12/1991 | Narita | 364/424.1 |
| 5,197,006 A | * | 3/1993 | Saitou et al. | 364/424.1 |
| 5,445,577 A | * | 8/1995 | Fujita et al. | 477/120 |
| 5,980,426 A | * | 11/1999 | Kamada et al. | 477/143 |

* cited by examiner

Primary Examiner—Matthew C. Graham
(74) Attorney, Agent, or Firm—Birch, Stewart, Kolasch & Birch, LLP

(57) ABSTRACT

A power Off upshift control method for an automatic transmission includes the steps of: a) determining if a vehicle is under conditions requiring power Off upshift control; b) starting power Off upshift duty control if the conditions are satisfied; c) calculating average turbine rpm change rate; d) measuring turbine rpm changing period and determining if the turbine rpm changing period is greater than a predetermined value; e) calculating a shift finish point if the turbine rpm changing period is greater than the predetermined value; f) determining if the turbine rpm change rate is less than a value obtained by adding a mapping value to the turbine rpm change rate; g) determining if the turbine rpm value is greater than or equal to the shift finish point, if the turbine rpm change rate is greater than the mapped value in the previous step; h) producing a shift finish point duty rate if the turbine rpm value is greater than or equal to the shift finish point; i) determining if the turbine rpm is less than a target turbine rpm; j) ending duty control if the turbine rpm is less than the target turbine rpm; k) determining if the turbine rpm is less than the a value obtained by subtracting 100 rpm from the target turbine rpm; and l) compensating duty rate and learn the duty rate if the turbine rpm is less than the subtracted value in the previous step.

15 Claims, 3 Drawing Sheets

\* ax: a predetermined value

POWER OFF UPSHIFT CONTROL METHOD FOR AUTOMATIC TRANSMISSION

BACKGROUND OF THE INVENTION (a) Field of the Invention

The present invention relates to a power Off upshift control method for an automatic transmission, and more particularly, to a control method for an automatic transmission capable of reducing shift shock caused by engine rpm reduction and hydraulic response delay.

(b) Description of the Related Art

In an automatic transmission, gear shifting is generally performed in such a way that a transmission control unit TCU controls a plurality of solenoid valves for guiding hydraulic pressure so as to apply and release the pressure to and from specific friction elements, resulting in obtaining a target gear ratio in the transmission.

That is, if a shift lever is manipulated to indicate a target speed range, a manual valve in a hydraulic system responsively converts its ports to a corresponding speed range arrangement such that hydraulic pressure from an oil pump is distributed to expected hydraulic lines. The distributed pressure is selectively supplied to various friction elements via various valves under control of the TCU.

Thus, the shift performance of the automatic transmission is determined in accordance with how timely corresponding friction elements response to the shift lever manipulation.

The different types of shift control include power On/Off upshifting during which the shift takes place in a sequential fashion from 1 to 4 in each state whether an accelerator pedal is depressed or not, power On/Off downshifting during which the shift take place in a sequential fashion from 4→1 in each state whether the accelerator pedal is depressed or not, and skip shifting such as 4→2 and 3→1 shifts.

Among the above shift types, the present invention relates to the power Off upshift control.

If there is a shift lever manipulation for power Off upshift, for example 1→2 shift, the shift is conventionally performed in accordance with a predetermined shift pattern stored in a memory of the TCU.

In the conventional power Off upshift control method, since compensation for engine rpm reduction and response time delay of the friction element is not considered, shift shock is experienced during the shift operation.

SUMMARY OF THE INVENTION

The present invention has been made in an effort to solve the above problems.

It is an object of the present invention to provide a power Off upshift control method for an automatic transmission capable of reducing shift shock by compensating for the engine rpm reduction and response time delay of the friction elements using learning control.

To achieve the above object, the power Off upshift control method of the present invention comprises the steps of a) determining if a vehicle is under conditions requiring power Off upshift control; b) starting power Off upshift duty control if the conditions are satisfied; c) calculating average turbine rpm change rate; d) measuring turbine rpm changing period and determining if the turbine rpm changing period is greater than a predetermined value; e) calculating a shift finish point if the turbine rpm changing period is greater than the predetermined value; f) determining if the turbine rpm change rate is less than a value obtained by adding a mapping value to the turbine rpm change rate; g) determining if the turbine rpm value is greater than or equal to the shift finish point, if the turbine rpm change rate is greater than the mapped value in the previous step; h) producing a shift finish point duty rate if the turbine rpm value is greater than or equal to the shift finish point; i) determining if the turbine rpm is less than a target turbine rpm; j) ending duty control if the turbine rpm is less than the target turbine rpm; k) determining if the turbine rpm is less than the a value obtained by subtracting 100 rpm from the target turbine rpm; and l) compensating duty rate and learn the duty rate if the turbine rpm is less than the subtracted value in the previous step.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described, with an example of 1→2 power Off upshift control, in detail with reference to the accompanying drawings.

Figure 1:
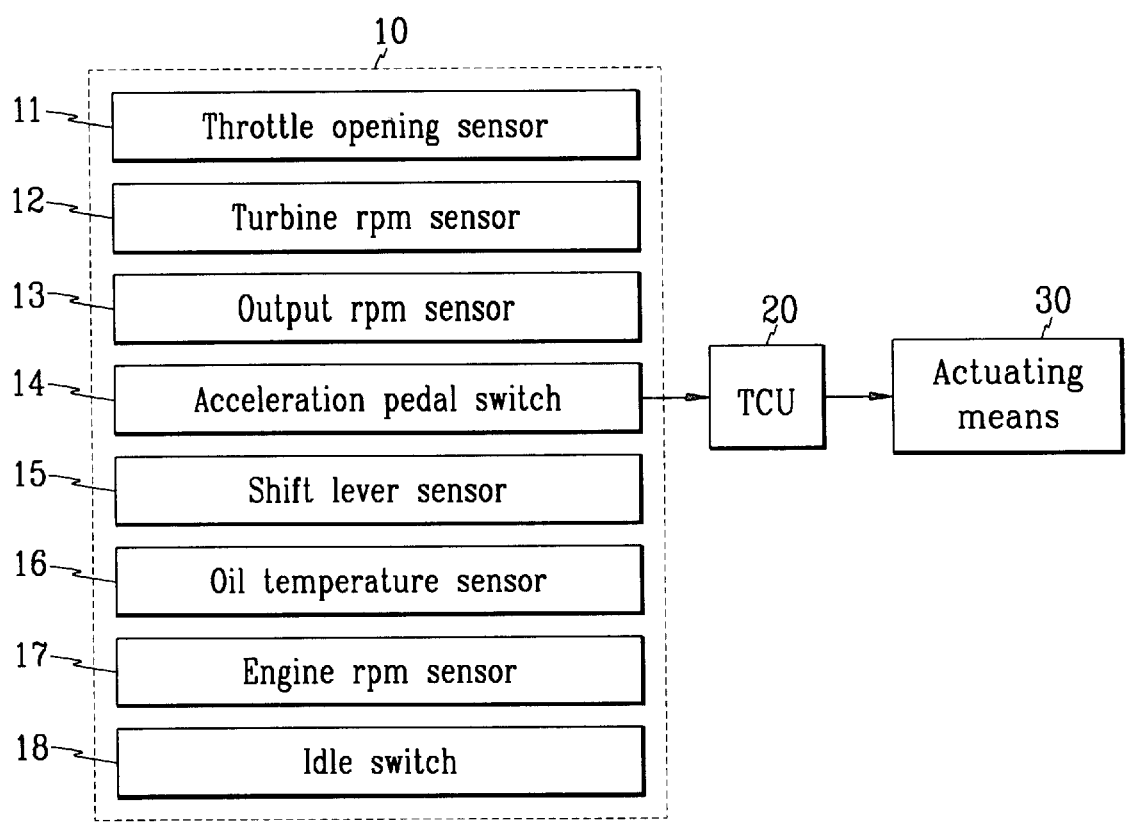
FIG. 1 is a block diagram of an automatic transmission to which the present invention is applied.

As shown in FIG. 1, an automatic transmission comprises vehicle condition detecting means 10 including a throttle opening sensor 11, a turbine rpm sensor 12, a output rpm sensor 13, an acceleration pedal switch 14, a shift lever sensor 15, an oil temperature sensor 16, an engine rpm sensor 17, an idle switch 18; a TCU 20 for gathering data from the vehicle condition detection means, analyzing the data, and responsively produce control signal; and actuating means 30 for performing shift operation according to the signal from the TCU 20.

Figure 2:
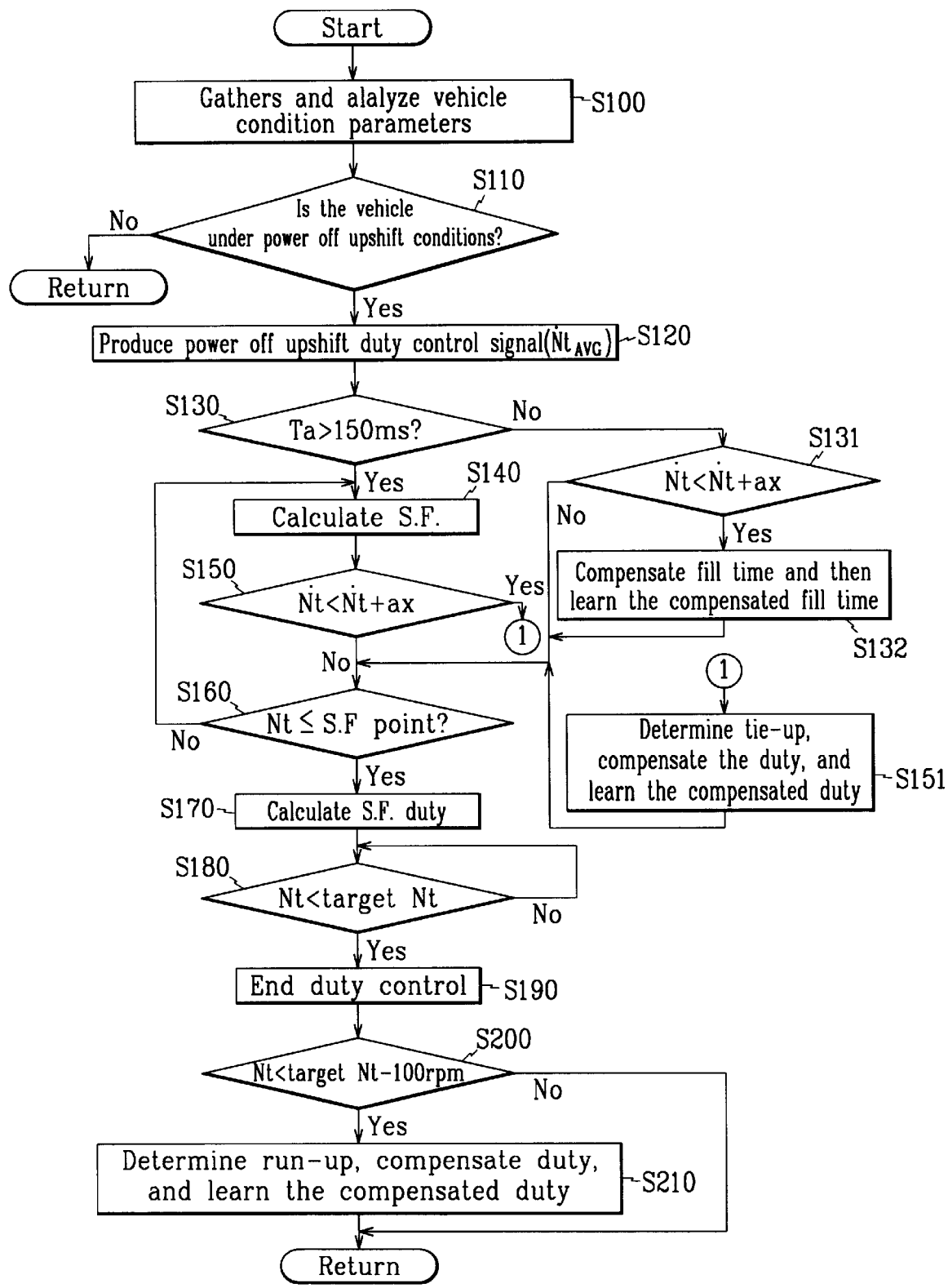
FIG. 2 is a flow chart of a power Off upshift control method according to a preferred embodiment of the present invention.

FIG. 2 shows a flow chart of the power Off upshift control method according to a preferred embodiment of the present invention.

If the engine start, the transmission enters a first forward speed range and the TCU 20 sends request signal to the vehicle condition detection means 10 and then the vehicle condition detection means 10 gathers vehicle condition parameters from the throttle opening sensor 11, the turbine rpm sensor 12, the output rpm sensor 13, the acceleration pedal switch 14, the shift lever sensor 15, the oil temperature sensor 16, the engine rpm sensor 17, and the idle switch 18 and responsively sends periodic vehicle condition parameters to the TCU 20 in step S100.

After receiving the vehicle condition parameters, the TCU 20 analyzes the parameters and determines if the parameters satisfy 1→2 the upshift conditions in step S110.

Figure 3:
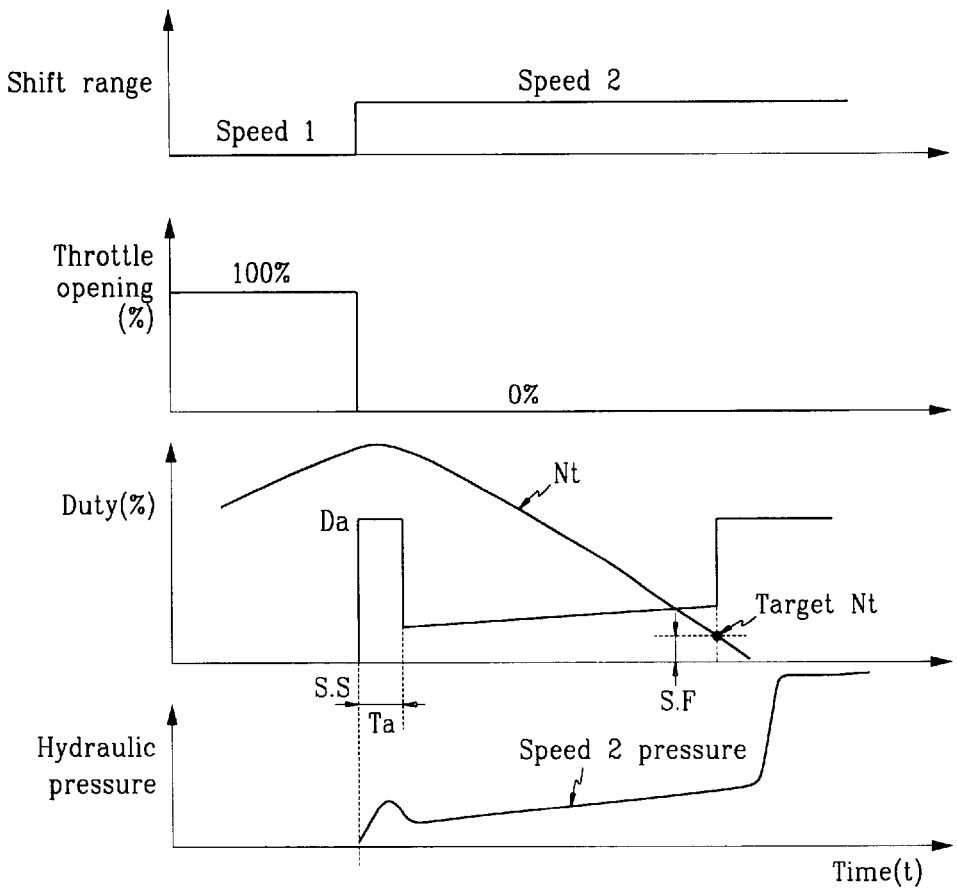
FIG. 3 is a graph showing shift pattern of the power Off upshift control method according to the preferred embodiment of the present invention.

If parameters satisfy the conditions, the TCU 20 responsively produces 1→2 power Off upshift duty control signal to the actuating means 30 as shown in FIG. 3 so as to perform 1→2 shift and continuously calculates average turbine rpm changing rate $\overset{\circ}{\mathrm{Nt}}_{AVG}$ using equation 1 in step S120.

$$\overset{\circ}{Nt}_{AVG} = \frac{\overset{\circ}{Nt_1} + \overset{\circ}{Nt_2} + \overset{\circ}{Nt_3}}{3} \qquad <\text{Equation 1}>$$

Nt: turbine rpm $\overset{\circ}{\mathrm{Nt}}_{AVG}$: average turbine rpm change rate $\overset{\circ}{\mathrm{Nt}}$: turbine rpm change rate Consequently, the TCU 20 determines if a turbine rpm changing period Ta after starting duty control is greater than 150 ms in step S130.

If the turbine rpm changing period Ta is greater than 150 ms, the TCU 20 calculates a shift finish point S.F. using equation 2 in step S140.

$$S.F. = (\overset{\circ}{N}t_{AVG} \times T_{PR}) + Nt_{ob}$$

S.F.: shift finish point $\mathrm{Nt}_{AVG}$: average turbine rpm change rate $\mathrm{Nt}_{PR}$: hydraulic response time $\mathrm{Nt}_{ob}$: target turbine rpm The target turbine rpm $\mathrm{Nt}_{ob}$ is calculated by multiplying a running vehicle speed to a target gear ratio.

$\mathrm{Nt}_{ob}$=No x target gear ratio

Next, the TCU 20 determines if the turbine rpm change rate $\overset{\circ}{\mathrm{Nt}}$ is less than a value of $\overset{\circ}{\mathrm{Nt}}$+"ax" wherein "ax" is a mapping value in step S150.

If the turbine rpm change rate $\overset{\circ}{\mathrm{Nt}}$ is less than the value, $\overset{\circ}{\mathrm{Nt}}$+ax, the TCU 20 determines that the friction element is tied up, and then compensates for the present duty rate to a predetermined value (for example 1%) and learn the value in step S151.

The learning control is performed only when all the following conditions are satisfied.

1) During the power Off upshift
2) When throttle opening is equal to or greater than 0.65 and the idle switch is on.
3) When the oil temperature is greater than 0° C.

If among the three conditions is not satisfied, the TCU 20 stops the learning control.

After the step S151, the TCU 20 determines if the turbine rpm change rate Nt is less than the shift finish point value S.F. in step S160.

In step S150, if the condition, $\overset{\circ}{\mathrm{Nt}}<\overset{\circ}{\mathrm{Nt}}$+ax, is not satisfied, the TCU 20 skip the step S151 and directly take into the step S160.

Also, in step S130, if the condition Ta>150 ms is not satisfied, the TCU 20 determines if the condition $\overset{\circ}{\mathrm{Nt}}<\overset{\circ}{\mathrm{Nt}}$+ax is satisfied in step S131.

If the condition $\overset{\circ}{\mathrm{Nt}}<\overset{\circ}{\mathrm{Nt}}$+ax is satisfied, the TCU 20 compensate for the present fill time and learn the compensated fill time in step S132, and then takes into the step S160.

However, in the step S131, if the condition, $\overset{\circ}{\mathrm{Nt}}<\overset{\circ}{\mathrm{Nt}}$+ax, is not satisfied, the TCU 20 directly takes into the step S160 without the fill time compensation.

Figure 4:
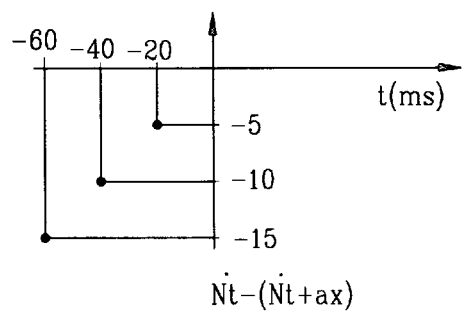
FIG. 4 is a graph showing fill time compensation map for the upshift control method of the present invention.

The compensated fill time value is obtained by mapping the present value to a value calculated by a predetermined program as shown in FIG. 4.

When the fill time compensation is needed, the TCU 20 take into the step S160 without the shift finish point S.F. calculation.

In step S160, if the condition, Nt≦Nt (S.F.), is satisfied, the TCU 20 produces a duty value at the shift finish point S.F. in step S170, and then determines that if the turbine rpm Nt is less than a target turbine rpm $\mathrm{Nt}_{ob}$ in step S180.

The compensated duty value is calculated by adding a compensation duty (ΔD) to the present duty value.

If the turbine rpm Nt is less than the target turbine rpm $\mathrm{Nt}_{ob}$, the TCU 20 determines that the shift synchronization is completed so as to end the duty control in step S190, and then determines if the turbine rpm Nt is less than the value of target turbine rpm $\mathrm{Nt}_{ob}$–100 rpm in step S200.

If the turbine rpm Nt is less than the value of target turbine rpm $\mathrm{Nt}_{ob}$–100 rpm, the TCU 20 determines that a run-up occurs because the corresponding friction element is not completely established such that the TCU 20 compensates for the present duty value by adding a compensation value (for example 1%) and learns the compensated value in step S210.

The learning control is performed only when all the following conciliations are satisfied.

1) During the power Off upshift
2) When throttle opening is equal to or greater than 0.65 and the idle switch is on.
3) When the oil temperature is greater than 0° C.

If among the three conditions is not satisfied, the TCU 20 stops the learning control.

In the case when the condition, Nt<$\mathrm{Nt}_{ob}$–100 rpm, is not satisfied, the TCU 20 determines the friction element is completely established so as to return to main routine.

As described above, the power Off upshift control method for the automatic transmission of the present invention calculates a differentiation value of the turbine rpm and hydraulic response time during the power Off upshift operation so as to determine if shift shock is generated at the real shift finish point in consideration with the hydraulic response time or not. If it is determined that the shift shock is generated, the duty is compensated and the compensated duty is learned so as to be adapted at the next duty control, resulting in reducing the shift shock caused by the engine rpm reduction and the hydraulic response time delay in the friction elements.

Although preferred embodiment of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A power Off upshift control method for an automatic transmission comprising the steps of:
   a) determining if a vehicle is under conditions requiring power Off upshift control;
   b) starting power Off upshift duty control if the conditions are satisfied;
   c) calculating average turbine rpm change rate;
   d) measuring turbine rpm changing period and determining if the turbine rpm changing period is greater than a target fill time;
   e) calculating a shift finish point if the turbine rpm changing period is greater than the predetermined value;
   f) determining if the turbine rpm change rate is less than a value obtained by adding a mapping value to the turbine rpm change rate;

g) determining if the turbine rpm value is greater than or equal to the shift finish point rpm, if the turbine rpm change rate is greater than the mapped value in the previous step;

h) producing a shift finish point duty rate if the turbine rpm value is greater than or equal to the shift finish point;

i) determining if the turbine rpm is less than a target turbine rpm;

j) ending duty control if the turbine rpm is less than the target turbine rpm;

k) determining if the turbine rpm is less than the a value obtained by subtracting a predetermined value from the target turbine rpm; and l) compensating duty rate and learn the duty rate if the turbine rpm is less than the subtracted value in the previous step.

2. A power Off upshift control method of claim 1 wherein the average turbine rpm change rate in step c) is obtained by dividing an arithmetic summation of turbine rpm change rates at several points in time.

3. A power Off upshift control method of claim 1 further comprises of the steps of:

determining if the turbine rpm change rate is less than a value obtained by adding a mapping value to the turbine rpm change rate, if the condition of the turbine rpm change period in step d) is not satisfied;

compensating for a beginning fill time and learning the compensated fill time if the turbine rpm change rate is less than a value obtained by adding a mapping value to the turbine rpm change rate; and taking into the step g) without the fill time compensation if the turbine rpm change rate is greater than or equal to the value obtained by adding a mapping value to the turbine rpm change rate in the previous step.

4. A power Off upshift control method of claim 3 wherein the beginning fill time is obtained by subtracting compensated fill time from a present fill time.

5. A power Off upshift control method of claim 4 wherein the compensated fill time is set by mapping the present value to a value calculated by a predetermined program.

6. A power Off upshift control method of claim 1 wherein the shift finish point calculation is not performed if the condition of the turbine rpm change period in step d) is not satisfied.

7. A power Off upshift control method of claim 1 wherein the shift finish point is obtained by adding a value calculated by multiplying the average turbine rpm change rate by a hydraulic response time to the target turbine rpm.

8. A power Off upshift control method of claim 1 wherein duty compensation is performed and learned as determined a tie-up occurs if the condition of the turbine rpm change rate in step f) is satisfied.

9. A power Off upshift control method of claim 8 wherein the duty compensation value is obtained by subtracting a predetermined value from a present duty value.

10. A power Off upshift control method of claim 5 wherein the shift finish point calculation is not performed during the duty compensation.

11. A power Off upshift control method of claim 1 wherein the duty compensation is performed by adding a predetermined value to the present duty.

12. A power Off upshift control method of claim 11 wherein the predetermined value is 1% of the present duty.

13. A power Off upshift control method of claim 1, wherein the learning is performed only when all the following condition are satisfied.

During the power Off upshift.

When throttle opening is equal to or less than 0.65 v and the idle switch is on.

When the oil temperature is greater than 0° C.

14. A power Off upshift control method of claim 1 wherein the learning is stopped if among the three conditions is not satisfied.

15. A power Off upshift control method of claim 1 wherein the learning is performed when the throttle opening is greater than 0.65 v or the oil temperature is equal to or less than 0° C., if a value obtained by subtracting the target turbine rpm from the present turbine rpm is less than −100.

* * * * *